US007984380B2

(12) United States Patent
Mindrum

(10) Patent No.: US 7,984,380 B2
(45) Date of Patent: Jul. 19, 2011

(54) METHOD FOR AUTOMATICALLY CREATING BOOK DEFINITIONS

(75) Inventor: Gordon Scott Mindrum, Cincinnati, OH (US)

(73) Assignee: Making Everlasting Memories, LLC, Cincinnati, OH (US)

( * ) Notice: Subject to any disclaimer, the term of this patent is extended or adjusted under 35 U.S.C. 154(b) by 856 days.

(21) Appl. No.: 11/871,556

(22) Filed: Oct. 12, 2007

(65) Prior Publication Data
US 2009/0100369 A1 Apr. 16, 2009

(51) Int. Cl.
G06F 3/00 (2006.01)
(52) U.S. Cl. .......... 715/763; 715/776; 715/204
(58) Field of Classification Search .......... 715/776, 715/763, 204
See application file for complete search history.

(56) References Cited

U.S. PATENT DOCUMENTS

| 5,061,138 A | 10/1991 | Allsopp et al. |
| 5,213,461 A | 5/1993 | Kalisher |
| 5,465,213 A | 11/1995 | Ross |
| 5,735,659 A | 4/1998 | Kosasa et al. |
| 5,774,688 A | 6/1998 | Georgitsis et al. |
| 6,012,890 A | 1/2000 | Celorio Garrido |
| 6,704,733 B2 | 3/2004 | Clark et al. |
| 6,865,548 B2 | 3/2005 | Wiechers |
| 6,910,843 B2 | 6/2005 | Saw et al. |
| 7,061,636 B2 | 6/2006 | Ryan et al. |
| 7,092,963 B2 | 8/2006 | Ryan et al. |
| 7,206,087 B2 | 4/2007 | Ryan et al. |
| 7,210,103 B2 | 4/2007 | Kasahara et al. |
| 7,236,934 B1 | 6/2007 | Mayes |
| 2002/0057453 A1 | 5/2002 | Michaelis et al. |
| 2003/0099526 A1* | 5/2003 | Saw et al. ............ 412/19 |
| 2005/0125726 A1 | 6/2005 | Harper et al. |
| 2006/0161782 A1 | 7/2006 | Kassan |
| 2006/0210379 A1 | 9/2006 | Kearns |
| 2007/0089053 A1 | 4/2007 | Uhlig et al. |
| 2008/0177731 A1* | 7/2008 | Matsuzaki ............ 707/5 |
| 2008/0215615 A1* | 9/2008 | Hoover et al. ......... 707/103 R |
| 2008/0270889 A1* | 10/2008 | Slosar ............ 715/235 |
| 2008/0270930 A1* | 10/2008 | Slosar ............ 715/776 |
| 2008/0319871 A1* | 12/2008 | Thomas et al. ........ 705/26 |
| 2009/0006951 A1* | 1/2009 | Mori et al. ......... 715/273 |
| 2009/0100369 A1* | 4/2009 | Mindrum ........... 715/776 |

FOREIGN PATENT DOCUMENTS

| GB | 2 368 688 | 5/2002 |
| WO | WO 01/00423 | 1/2001 |

OTHER PUBLICATIONS

Patent Search Report, Landon IP, Inc., Order No. 81392.
U.S. Appl. No. 11/427,524, filed Jun. 29, 2006, Sefton et al.

* cited by examiner

Primary Examiner — Ryan F Pitaro
(74) Attorney, Agent, or Firm — Frost Brown Todd LLC; William S. Morriss

(57) ABSTRACT

Book definitions can be dynamically created based on content provided by a user. Such dynamic creation can include organization of user-supplied content into appropriate form, adjustment of book cover properties to match the user-supplied content, and verification that the user supplied content is appropriate for presentation in book form. Various interfaces can also be provided which allow users to generate a book definition based on a minimum of information.

4 Claims, 4 Drawing Sheets

| | | | | | | | | |
|---|---|---|---|---|---|---|---|---|
| Order Status ⊙ Not Yet Ordered  ○ Order Placed  Go! | | | | | | | | |
| Highlighted entries are deemed to have enough content to order | | | | | | | | |
| Results (46) | | | | | | | | |
| ≪ ≤ 1 2 3 4 5 ≥ ≫ | | | | | | | | |
| Person ID | Last Name | First Name | Sale Date | Biography Word Count | # of Photos | Messages Published Count | | |
| 1940752 | Doe | Jane | 7/12/2007 | 389 | 61 | 13 | Edit | |
| 1840877 | Johantgen Photos | The Farm's Welcome-- | 5/2/2007 | 39 | 182 | 0 | Edit | |
| 1840879 | Johantgen Photos | House Of Hope Office and Board-- | 5/2/2007 | 49 | 18 | 0 | Edit | |
| 1840881 | Johantgen Photos | Images of Pakistan-- | 5/2/2007 | 28 | 23 | 0 | Edit | |
| 1945456 | Johantgen | Meetings at the Farm | 7/28/2007 | 0 | 127 | 0 | Edit | |
| 1896023 | Gerdeman | Chute | 6/6/2007 | 455 | 31 | 0 | Edit | |
| ≪ ≤ 1 2 3 4 5 ≥ ≫ | | | | | | | | |

501

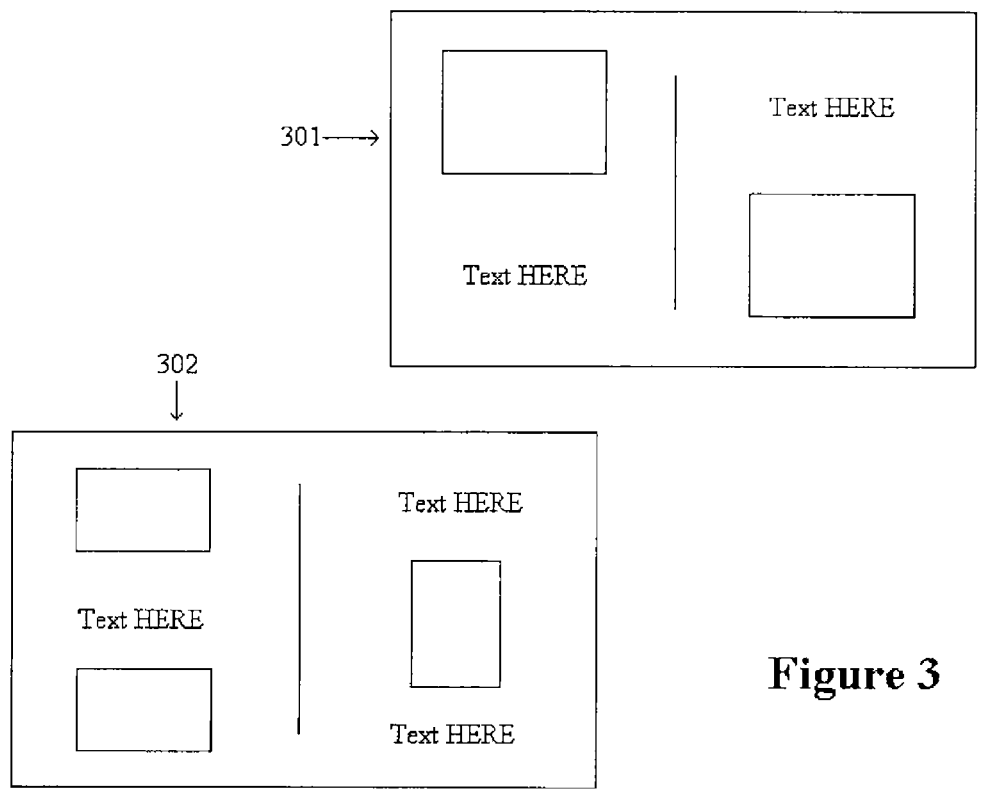
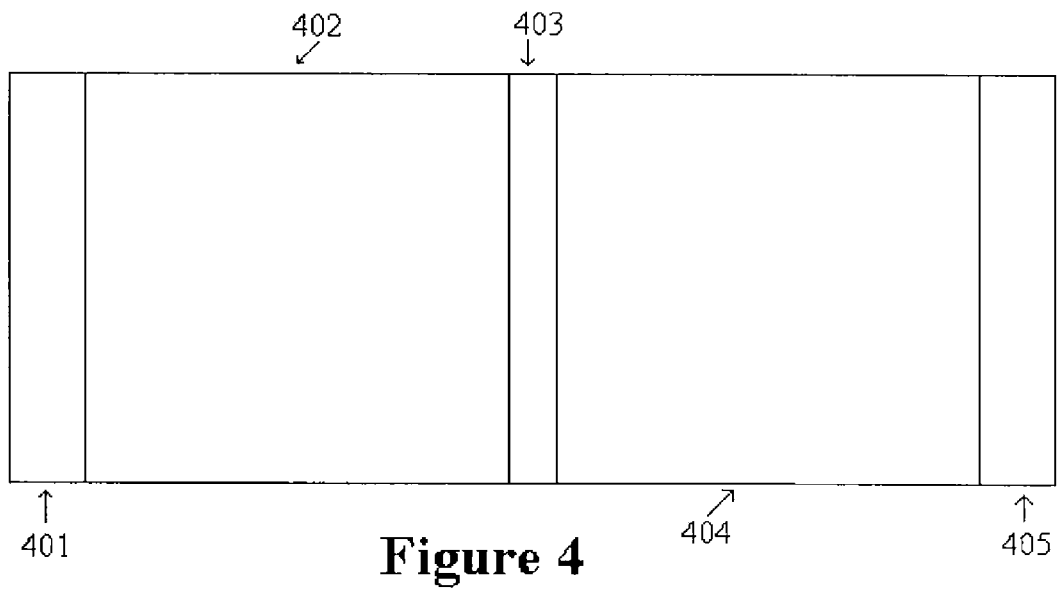
Figure 3
Figure 4

Order Status ⊙ Not Yet Ordered ○ Order Placed  Go!

Highlighted entries are deemed to have enough content to order

Results (46)

<< < 1 2 3 4 5 > >>

| Person ID | Last Name | First Name | Sale Date | Biography Word Count | # of Photos | Messages Published Count | |
|---|---|---|---|---|---|---|---|
| 1940752 | Doe | Jane | 7/12/2007 | 389 | 61 | 13 | Edit |
| 1840877 | Johantgen Photos | The Farm's Welcome-- | 5/2/2007 | 39 | 182 | 0 | Edit |
| 1840879 | Johantgen Photos | House Of Hope Office and Board-- | 5/2/2007 | 49 | 18 | 0 | Edit |
| 1840881 | Johantgen Photos | Images of Pakistan-- | 5/2/2007 | 28 | 23 | 0 | Edit |
| 1945456 | Johantgen | Meetings at the Farm | 7/28/2007 | 0 | 127 | 0 | Edit |
| 1896023 | Gerdeman | Chute | 6/6/2007 | 455 | 31 | 0 | Edit |

METHOD FOR AUTOMATICALLY CREATING BOOK DEFINITIONS

FIELD

The field of this invention is the automated creation of book definitions based on user supplied content.

BACKGROUND

To create a book definition often requires substantial user input regarding the form of the final book. However, in many cases it can be desirable to minimize the amount of information which the user is required to provide regarding the book to be created. Similarly, as a user is often more acquainted with the content they wish to include in a book than they are with the physical attributes of the book itself, it can be beneficial to allow a book to be created based on information from the user which is semantically related to the book's content, rather than requiring the user to provide information concerning the physical attributes of the book to be created. Further, there will be many cases where it is beneficial to supplement content provided by a user for a book with additional content which may help enhance the atmosphere or appearance of a book. Additionally, in many cases, information which is originally intended for a different purpose can be beneficially presented in the form of a book. Accordingly, there is a need in the art for technology which addresses one or more of the deficiencies set forth above.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 3 depicts templates which could potentially be used to organize text and pictures.

FIG. 4 depicts a template which can be used to specify dimensions of cover elements for a book.

FIG. 5 depicts an interface which could be used to select a set of content for presentation in book form.

DETAILED DESCRIPTION

The following description sets forth certain techniques which can be used in the creation of books. It should be understood that that description is intended to allow one of ordinary skill in the art to practice the techniques set forth herein, and is not intended to be limiting on the scope of potential applications which could be made of the inventors' discoveries.

Figure 1:
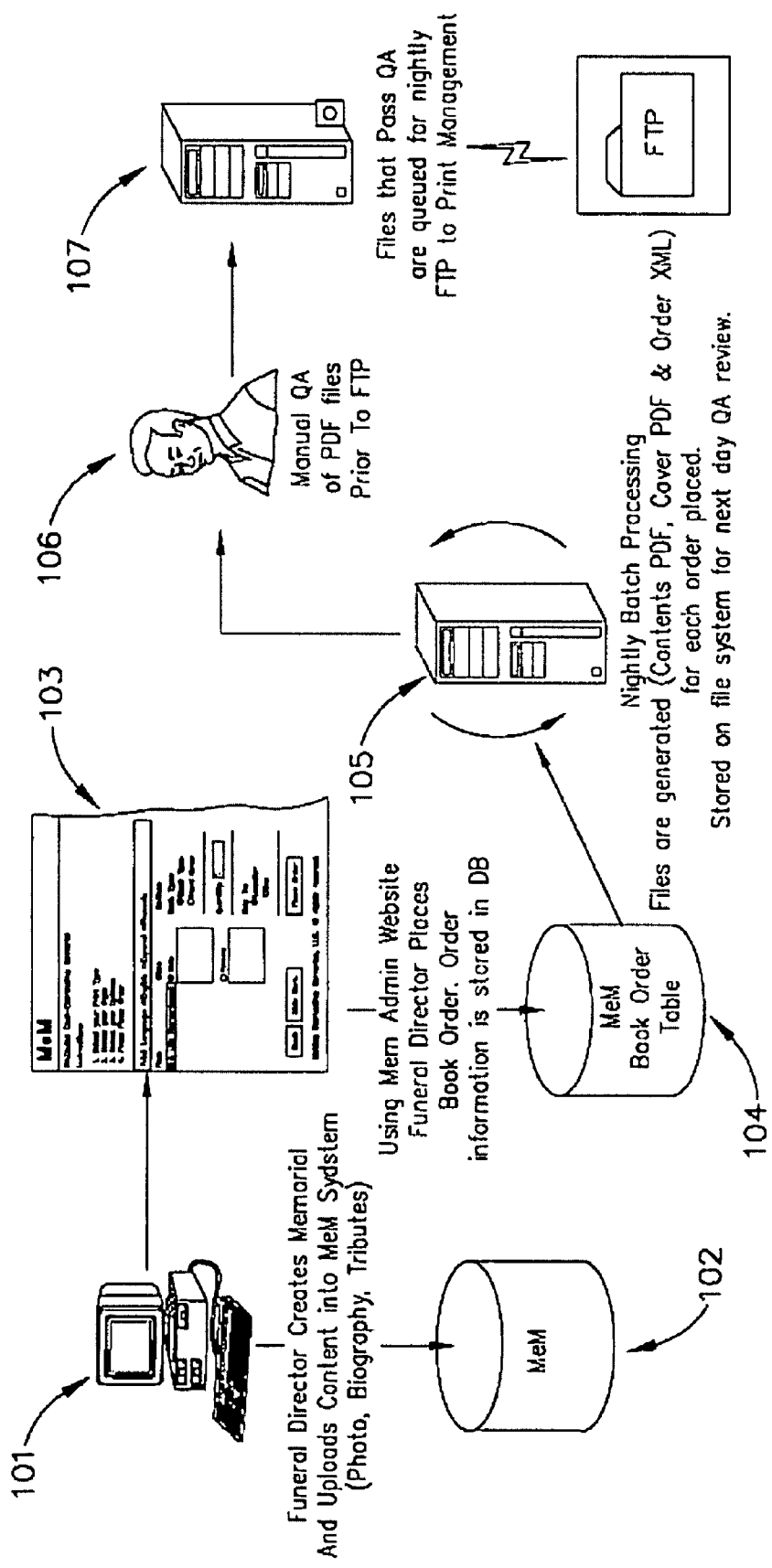
FIG. 1 depicts an overview of a dynamic book generation process.

Turning now to FIG. 1, that figure depicts an overview of various components and interfaces which can be used in dynamic book creation. As shown in that figure, an upload computer (101) can be used to load content into a content database (102). In an exemplary implementation of the teachings of this disclosure, the upload computer (101) could be a personal computer used by a funeral director to store information related to a recently deceased person. Such information could include biographical information regarding the deceased person, tributes to the person, pictures of or related to the person, and/or other information. Such information might have been uploaded for presentation in book form, could have been originally uploaded for a different purpose (e.g., a computerized presentation such as which might be provided as part of a memorial service or on a website), or could have been uploaded at various times with various purposes. The database can be implemented to be able to store and organize information which is expressed in a variety of forms (e.g., text, audio, video, photographs, pictures, or other forms). Of course, it should be understood that the teachings of this disclosure are not limited to being implemented in a manner in which the upload computer (101) is operated by a funeral director. For example, it is also possible that the upload computer (101) might be a computer which accesses a content upload interface using a network access application (e.g, a web browser, a network client, a proprietary database access application, or other forms of application) that enables the user of the upload computer (101) to add data to the content database (102). Similarly, it should be understood that, while an illustrative example of a potential use of the teachings of this disclosure is the creation of a book related to a deceased person, the content uploaded to the content database (102) is not limited to information related to a deceased person. For instance, information related to a historical event, a personal event or celebration, a business event, a marketing campaign, a political party or business organization, or any other information could also be uploaded to a content database (102) and presented in book form using the teachings of this application. Further techniques for entering information into a database and types of information which could be so entered are set forth in U.S. patent application Ser. No. 11/427,524, the disclosure of which is incorporated by reference in its entirety. Accordingly, while an exemplary implementation of the teachings of this disclosure is set forth in the context of creation of a book regarding a deceased person, that implementation should be understood to be illustrative only, and not limiting.

After information has been uploaded into a database (102), that information can be evaluated to determine suitability for presentation in book form. As an illustration of a potential technique for implementing such an evaluation, consider a circumstance where a book is being made commemorating a recently deceased individual. In such a case, if there is too little content uploaded into the database (102), creating a book based on that content might be an inappropriate way to memorialize the deceased individual, because, for example, it might imply that there was very little to say commemorating that person's life. To help avoid this problem, content thresholds can be implemented in software which screens content uploaded into a database (102) before the process of creating a book from that content can be begun. For instance, if a book commemorating a recently deceased individual is to be created through the combination of a textual biography, images related to the person (e.g., photographs), and one or more additional discrete items (e.g., tributes to the deceased individual), the thresholds might measure the length of the biography, and the number of images and discrete items. As a concrete example of this, software could be implemented which would test material uploaded to the database (102) and reject it if the biography had less than 1000 words, there were fewer than 50 images, or there were fewer than 16 additional discrete items (e.g., tributes). Then, if the content was rejected, the system would not allow an individual to create a book based on that content.

One technique which could be used to prevent a user from creating a book based on insufficient content is the use of a screening interface. As an example of such an interface, consider the interface presented in FIG. 5. In the interface of FIG. 5, a plurality of content sets is displayed. However, only one of those content sets (501) includes sufficient information to for presentation in book form. Accordingly as shown in FIG. 5, an indication (highlighting, though other indications such as checks, status bars, or other perceptible indicia could also be used) is provided for a user to identify the content set (501) which is suitable for use in creating a book. Such a screening interface could be utilized, for example, in the case of creating a book memorializing a recently deceased individual. In some circumstances, a funeral home director might view a screen such as shown in FIG. 5 to determine which recently deceased individuals could potentially have a book created for them based on content which had previously been uploaded. Of course, it should be understood that the description of thresholding software implemented in the context of evaluating content for presentation in a book memorializing a recently deceased individual set forth above is set forth for the purpose of illustration, and is not intended to be taken as an exhaustive recitation of potential implementations of the teachings of this application. For example it is possible to vary the threshold set forth above for evaluating content uploaded to a database (102) for a book memorializing a recently deceased individual. It is also possible that multiple alternative thresholds could be used to determine if content is sufficient to be presented in book form. This could be done, for instance, by checking to see if the content includes a biography of at least 250 words 50 pictures and 4 tributes or a biography of at least 500 words, 30 pictures and 2 tributes or a biography of at least 1000 words, 20 pictures and 16 tributes. Also, it is possible that in some implementations, instead of preventing an individual from creating a book based on the uploaded content, the system would present a warning message to an individual who wished to create a book with content that did not pass the threshold (or thresholds, as appropriate) or could suggest an alternative format for presenting material (e.g., a picture book, in a case where uploaded content included a substantial number of pictures and insufficient textual information). Accordingly, the illustrations of thresholds and their use should be understood as being illustrative only, and not limiting.

Returning now to the diagram of FIG. 1, the process of creating a book based on information uploaded to a database (102) can continue with organizing the information uploaded to the database (102) into a proper format for presentation as a book. This organization can take place in a variety of automated and semi-automated manners, and can use content provided by the user in the database (102), content solicited from the user by the system, and also predefined content which can be programmatically inserted. Further, processing can take place in a variety of manners, such as batch processing, online processing, or other forms of processing known to those of skill in the art. To illustrate a potential technique for placing content uploaded into a database (102) into book format, a process of gathering additional information from a user and formatting the content using templates is set forth below. However, it should be understood that that discussion is intended to be illustrative only, and should not be treated as limiting on the claims included in this application or any other related application.

Figure 2:
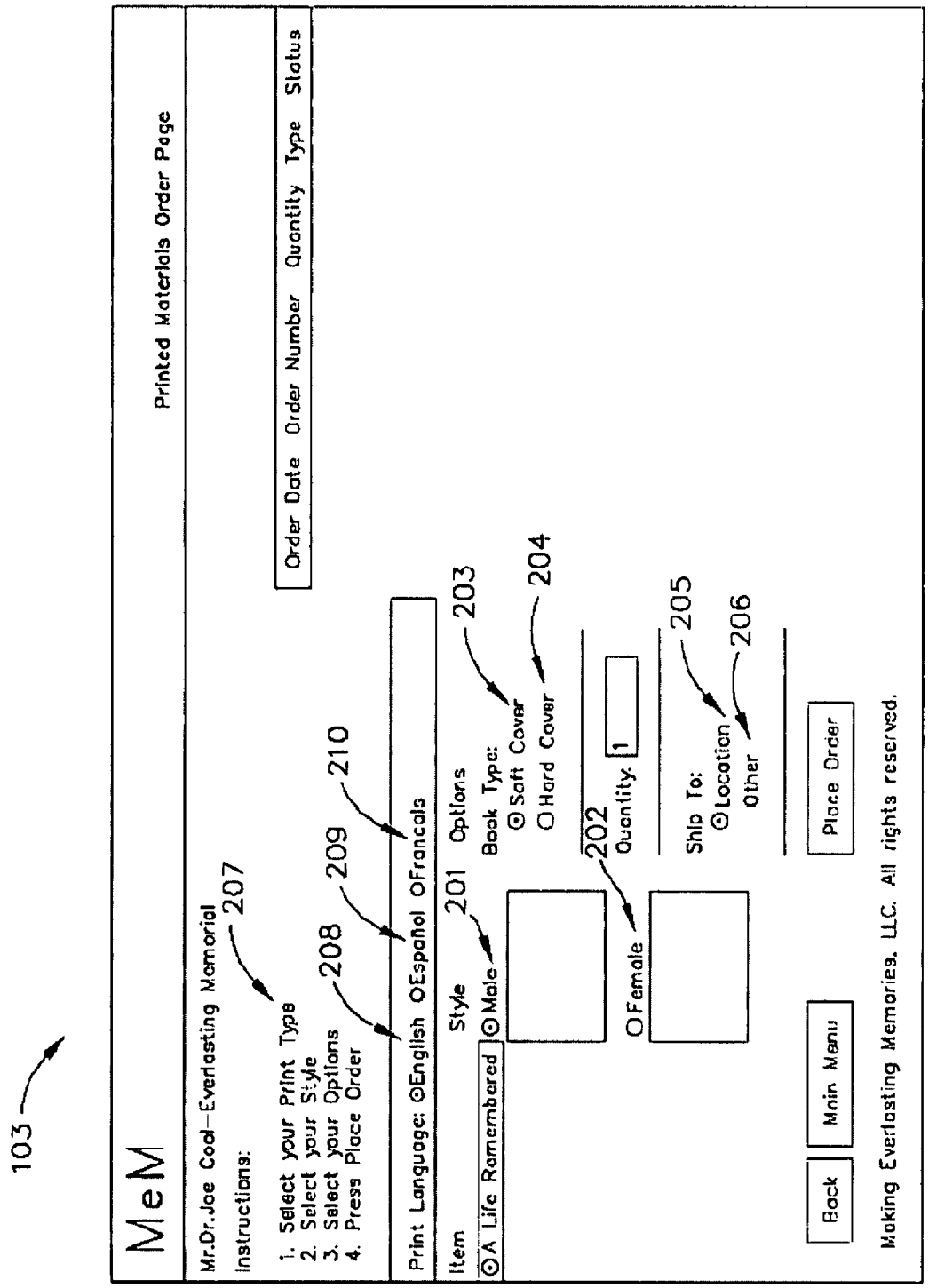
FIG. 2 depicts an exemplary book order interface screen.

Regarding the collection of additional information from a user, consider FIG. 2, which depicts an exemplary book order interface (103). In that interface (103) a set of instructions (207) is presented to the user which indicates how that user can specify information which will be used for the book. First, in the exemplary book order interface (103) of FIG. 2, a user may specify the language of text for use in the book to be created using the provided language selection radio buttons (208)(209)(210). In some embodiments automatically inserted text for the book (e.g., section headings, quotations, vignettes, etc) can be translated or modified based on the language selection. For example, there could be a database (or multiple databases) which includes sections of potential text for automatic insertion, with the different sections corresponding to different languages. Of course, language selection can be used for other purposes than selection or translation of automatically inserted text. For example, in the case of creation of a book memorializing a recently deceased individual, the language selection buttons (208)(209)(210) could be used to indicate a language that the text of a book should be translated into, so that if the book is to be provided to individuals who speak different languages, each individual will receive a book which is understandable.

Continuing, the book order interface (103) also includes style buttons (201)(202), which, in the interface shown in FIG. 2, indicate the gender style to be used for the book to be created. By selection of a style using broad categories such as gender, the user can have control over attributes of the book (e.g., background images, quotations, inserted vignettes, etc which might differ by selected gender) without having to specify particularly the attributes themselves (i.e., the user needs only select gender, rather than being required to select particular backgrounds, etc). Of course, it should be understood that the depiction of gender selection style buttons (201)(202) is not intended to indicate that selection of gender is the only style choice contemplated by the inventors. For example, in some instances other information semantically related to the uploaded content such as hobbies; a geographic region where the individual lived, was born, or where other significant events took place or which is otherwise associated with the individual (e.g., a city or region of the country); the individual's favorite sports teams; or other information could also be gathered. Like the gender information, other information obtained through the book order interface (103) could potentially be used to control aspects of a book such as background images, quotations and inserted vignettes. Thus, the gender selection shown in FIG. 2 should be understood as being illustrative only, and not limiting on potential implementations of the disclosure of this application.

Moving on, the book order interface (103) of FIG. 2 also includes an indication of a potential selection of whether the book to be created should be softcover or hardcover, as shown by the labeled radio buttons (203)(204). Further, in the book order interface (103) of FIG. 2 there is a set of radio buttons (205)(206) which can be used to indicate where physical copies of a completed book are to be shipped: to a predetermined location (205), or to a new location which could be specified by a user (206). For example, in an illustrative implementation in which the book order interface (103) is used in the context of creating a book memorializing a recently deceased individual, the predefined location where books might be shipped could be the physical premises of a funeral director who is managing the book order creation process. Alternately, the predefined location might be the house of the individual ordering the book, a library where the book might be displayed, or any other suitable location. In a situation where the individual ordering a book wishes to have the book shipped to a location other than the predefined location, he or she can choose the other location radio button (206). If such a choice is made, then a new location entry interface (not shown in FIG. 2) could be presented, which would allow the user to indicate the location where the book to be created should be shipped.

It should be understood that the book order interface (103) of FIG. 2 is intended to be illustrative only, and not limiting, and that variations on that interface could also be implemented by those of ordinary skill in the art in light of this disclosure. For example, in some scenarios, less information may be gathered in a book order interface (103) than is shown in FIG. 2. For example, in some scenarios, a book order interface (103) might not require an individual to specify whether a book should be created in hardcover or softcover format, which might be appropriate for a system where only a single type of book would be created (e.g., a softcover book). Also, as was set forth previously, a book order interface (103) such as depicted in FIG. 2 is not limited to being used in the context of creating a book memorializing a recently deceased person. For example, in a case where the book order interface was used to create a book related to a particular event (e.g., a marriage), the book order selection screen could gather information related to the individuals who were married. Of course, it should also be understood that information can also be culled from content which is uploaded for inclusion in a book to be created in addition to, or as an alternative to, gathering that information through an interface screen such as shown in FIG. 2. For example, software could look for key phrases such as _____ was an avid fly fisherman instead of relying on information collected from a book order interface to identify hobbies related to an individual to be described in a book to be created. Thus, the description of the book order interface (103) of FIG. 2 should be understood to be illustrative only, and not limiting.

Turning back now to FIG. 1, in that figure, after a user has requested that a book be created using a book order interface (103), the order information is uploaded to a database (104) (which may be the same database (102) where content was originally uploaded) and a definition for the book itself is created, for example, by batch processing (105). As an illustration of such batch processing, consider a circumstance in which the information uploaded into the database comprises a textual narrative (e.g., a biography of a recently deceased person), one or more images (e.g., photographs), and one or more self-contained content elements (e.g., textual tributes to a recently deceased person). In such a scenario, formatting the information in the database could include the step of combining textual and pictorial information, for example, through the use of layout templates (301)(302) as shown in FIG. 3. In such layout templates, text could be inserted into a multicolumn format, and pictures could be inserted into the predefined spaces in the text.

It is also possible that formatting information which had been uploaded into the database could include creation of different sections of a book. For example, there could be a section for the textual narrative (e.g., a biography, which could be presented with or without pictures in various embodiments), a section for pictures, and a section for content elements (e.g., tributes for a recently deceased person, as set forth previously). Also, it is possible that a book might include additional sections, such as sections which include space for writing personal messages (e.g., in the case of a recently deceased person, there might be a reflections section where family members could write personal recollections about the deceased person).

Further, it should also be understood, in addition to information uploaded into a database (102) by users of the system, information used in creating a book might include supplemental content. For instance, in a case where a book is created which is a biography of an individual, and a user indicated that the subject of the book is a fly fisherman, there might automatically be a 'vignette' inserted into the book which describes the native fish of the area the person fished at, and what those fish typically eat. Additional content external to that submitted by a user could include quotations appropriate for the book being created. For example, in the case of a book memorializing a recently deceased individual, quotations emphasizing continuity of life could be included in the book (e.g., "To live in hearts we leave behind is to not die"). Such quotations, vignettes, and other external content could be stored in a database and retrieved and/or organized according to various attributes of the book to be created (e.g., information provided in a book order interface (103)). Further processing which could take place to format information uploaded into a database (102) into a book could include proofing of the material to be included in the book (e.g., correction of obvious spelling and grammar errors) and arranging images within text according to tags associated with those images (e.g., placing an image with a "wedding" tag in proximity to textual material concerned with a wedding).

In addition to formatting the content of a book, batch processing (105) might also include defining the cover of the book which is to be created. By way of explanation of this process, consider the diagram of FIG. 4, that figure depicts a template which can be used to specify the dimensions of elements of a cover for a book. In FIG. 4, the template includes a spine section (403), a front cover section (404), and a back cover section (402). Additionally, the template as shown in FIG. 4 includes two bleed sections, a left bleed (401) and a right bleed (405). Those bleed sections represent portions of a book cover which would not be visible on the cover of the printed form of a final book. The left (401) and right (405) bleed sections can be used to specify to a printer that a book cover is to be printed in such a manner that the image(s) and/or pattern(s) selected for the front cover section (404) and back cover section (402) would completely fill the visible area from the intersection with the book's spine to the edge of the book's physical cover.

The particular measurements of the different sections of the template of FIG. 4 can be determined by an automated process. For example, to determine the width of the spine section (403), it is possible to multiply the number of pages in the completed book (determined during formatting of the content for the book) by the thickness of the paper used for those pages. With that width value, the dimension of the spine section (403) can be set appropriately. It is possible to define the remaining dimensions of the book cover template. Regarding the front cover (404) and back cover (402) sections, in many situations, the dimensions of those sections might be predetermined, for example, by cover art which is to be used for the book. In a case where the dimensions for the front cover (404) and back cover (402) are predetermined, the remaining dimensions for the book cover template such as shown in FIG. 4 might be calculated by subtracting the width of the spine section (403), and the widths of the front (402) and back (404) covers from the total width of the template. The result could then be divided by 2, and used as the width for the bleed sections (401)(405). Accordingly, the width of the bleed sections (401)(402) could be determined according to the following formula:

$$W_B = (W_T - (N)(W_P) - 2(W_C))(2^{-1})$$

Where $W_B$ is the bleed width, $W_T$ is the width of the template, N is the number of pages in the book, $W_P$ is the width of each page in the book, and $W_C$ is the width of the cover sections.

With the content to be included in the book formatted and the cover template defined, the information to be included in the book can be submitted for an additional quality assurance review (106). Such a review can be performed using a variety of techniques, including manual review by personnel of a service provider who creates a book, manual review by customers to verify that the organization and formatting of the book is acceptable before the book is printed, automated review of final book contents to verify that they meet certain requirements (e.g., thresholds, as described previously), or using combinations of automated and manual review by various parties. Upon completion of quality assurance review, the information defining the final book (e.g., one or more PDF files) is sent to a printer via FTP server (107), where appropriate books can be reproduced and delivered as indicated.

Of course, it should be understood that quality assurance review (106) and FTP transfer of book information (107) described above are presented in FIG. 1 for the sake of illustration only, and should not be treated as implying limitations on potential implementations of the teachings of this application. For example, in some circumstances, it is possible that a process including dynamic book creation could be used by an entity which creates books in house, rather than sending information to a printer for creation of actual products. In such a case, the step of placing book information on an FTP server might be potentially eliminated as redundant. Similarly, in some instances a book creation process such as described previously might be used to create virtual "books" rather than physical items. In such a case, instead of distributing book information to a printer, an entity creating the virtual book could upload the virtual book information to a web site where it could be viewed by interested parties. Of course, combinations of these approaches are also possible (e.g., an entity could create a virtual book and distribute actual paper copies of the book as well). Thus, the inventors' discoveries should not be limited to particular features described herein, and instead should be treated as extending to the full scope of the language of claims in this or any related application, when the words of those claims are given their broadest reasonable interpretation, as well as any processes, systems, compositions of matter or articles of manufacture which are only insubstantially different therefrom.

The invention claimed is:

1. A system comprising:
a) a database storing a set of data provided by a user;
b) a computer readable medium having stored thereon a set of computer executable instructions operable to configure a computer to analyze said set of data according to one or more requirements and to provide an indication of whether said set of data is suitable for presentation in a book form based on said analysis; and
c) a processor operable to perform said set of computer executable instructions;
wherein said set of data comprises one or more categories of content; and
wherein said analysis comprises comparing said set of data with thresholds for each of said one or more categories of content;
wherein said one or more categories of content comprise at least three categories of content, and wherein said thresholds are based on relative amounts of said at least three categories of content.

2. The system of claim 1 wherein said at least three categories of content comprise:
i) narrative content;
ii) pictorial content; and
iii) discrete entries.

3. A system comprising:
a) a database storing a set of data provided by a user;
b) a computer readable medium having stored thereon a set of computer executable instructions operable to configure a computer to analyze said set of data according to one or more requirements and to provide an indication of whether said set of data is suitable for presentation in a book form based on said analysis; and
c) a processor operable to perform said set of computer executable instructions;
wherein said set of data comprises one or more categories of content; and
wherein said analysis comprises comparing said set of data with thresholds for each of said one or more categories of content;
wherein said set of computer executable instructions is further operable to configure a computer to provide an indication of whether said set of data is suitable for presentation in an alternate form based on said analysis.

4. A system comprising:
a) a database storing a set of data provided by a user;
b) a computer readable medium having stored thereon a set of computer executable instructions operable to configure a computer to analyze said set of data according to one or more requirements and to provide an indication of whether said set of data is suitable for presentation in a book form based on said analysis; and
c) a processor operable to perform said set of computer executable instructions;
wherein said set of data comprises one or more categories of content; and
wherein said analysis comprises comparing said set of data with thresholds for each of said one or more categories of content;
wherein said set of computer executable instructions is further operable to configure a computer to allow the user to access an interface operable to receive book order information from the user if and only if said set of data is suitable for presentation in said book form.

* * * * *